United States Patent
Chiga

(10) Patent No.: US 9,458,804 B2
(45) Date of Patent: Oct. 4, 2016

(54) FILTER, ESPECIALLY FUEL FILTER

(75) Inventor: Antonio Chiga, Pontarme (FR)

(73) Assignee: FILTERTEK S.A., Plailly (FR)

( * ) Notice: Subject to any disclaimer, the term of this patent is extended or adjusted under 35 U.S.C. 154(b) by 2010 days.

(21) Appl. No.: 12/091,950

(22) PCT Filed: Nov. 23, 2006

(86) PCT No.: PCT/EP2006/011248
§ 371 (c)(1),
(2), (4) Date: Apr. 29, 2008

(87) PCT Pub. No.: WO2007/059969
PCT Pub. Date: May 31, 2007

(65) Prior Publication Data
US 2008/0283461 A1    Nov. 20, 2008

(30) Foreign Application Priority Data
Nov. 23, 2005 (DE) .................... 20 2005 018 435 U

(51) Int. Cl.
| | | |
|---|---|---|
| *F02M 37/22* | (2006.01) | |
| *B01D 27/00* | (2006.01) | |
| *B01D 29/23* | (2006.01) | |
| *B01D 29/13* | (2006.01) | |

(52) U.S. Cl.
CPC ............ *F02M 37/22* (2013.01); *B01D 27/005* (2013.01); *B01D 29/232* (2013.01)

(58) Field of Classification Search
USPC .......... 210/199, 200, 255, 262, 321.64, 335, 210/346, 232
See application file for complete search history.

(56) References Cited

U.S. PATENT DOCUMENTS

| | | | | |
|---|---|---|---|---|
| 3,872,008 A | * | 3/1975 | Lee et al. ....................... | 210/232 |
| 5,674,393 A | * | 10/1997 | Terhune et al. ............... | 210/315 |
| 5,695,638 A | | 12/1997 | Gubitz et al. | |

FOREIGN PATENT DOCUMENTS

| | | |
|---|---|---|
| EP | 1239145 A2 | 9/2002 |
| FR | 2812822 A1 | 2/2002 |

OTHER PUBLICATIONS

ISR for PCT/EP2006/011248 dated May 2, 2007.

* cited by examiner

*Primary Examiner* — Allison Fitzsimmons
(74) *Attorney, Agent, or Firm* — Hauptman Ham, LLP

(57) ABSTRACT

The invention relates to a filter, especially a fuel filter, comprising a housing of a suitable plastic material, consisting of an upper part and a lower part, and a concertinaed filter element arranged in the housing. Said housing separates an inlet from an outlet. The upper part is connected to the lower part by welding or the like. The front sides of the filter element are directly connected to the opposing front walls of the housing.

17 Claims, 1 Drawing Sheet

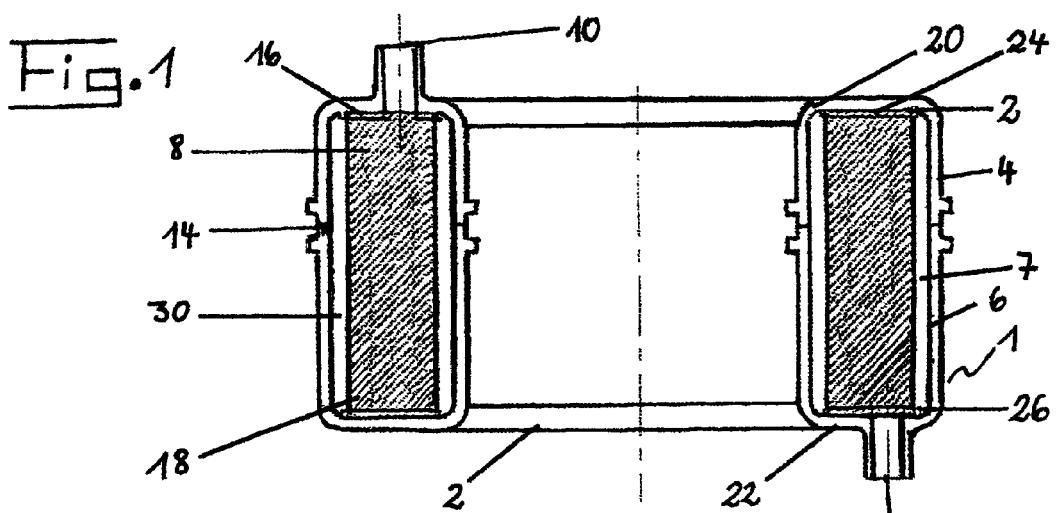
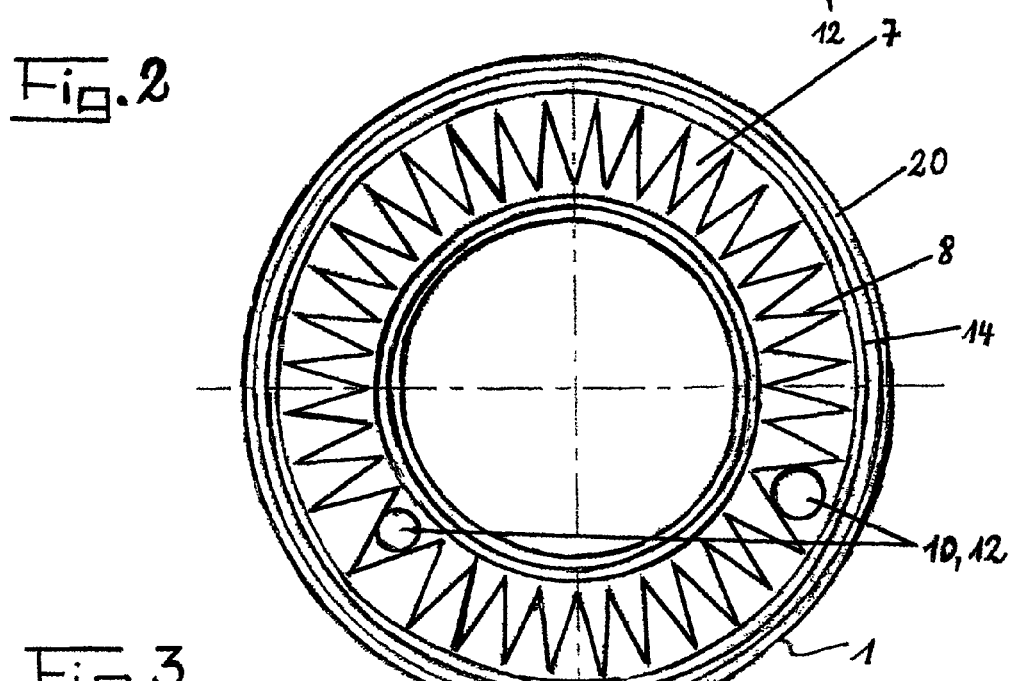
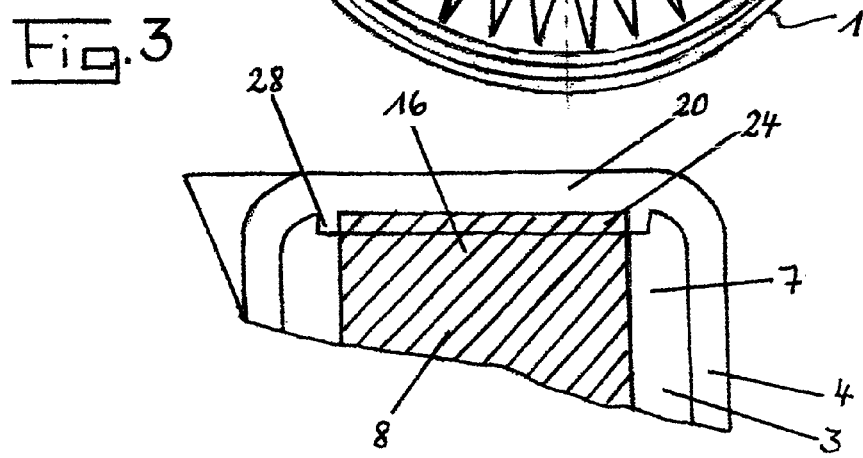

FILTER, ESPECIALLY FUEL FILTER

RELATED APPLICATIONS

The present application is based on International Application Number PCT/EP2006/011248 filed Nov. 23, 2006, and claims priority from German Application Number 20 2005 018 435.7 filed Nov. 23, 2005, the disclosures of which are hereby incorporated by reference herein in their entirety.

The invention relates to a filter, especially a fuel filter, having a housing of a suitable plastics consisting of a top part and a bottom part and of a concertina-like folded filter element within the housing, which is separating an inlet from an outlet, wherein the top part is joined with the bottom part by welding or the like.

Such filters are generally known and among others are used as so-called life-time filters for filtering fuels, especially in connection with combustion engines having fuel injection. Usually with such filters the concertina-like folded filter element is positioned in an annular-shape in the housing between a top part and a bottom part, wherein with known filters of this kind on the top end face of the filter element an additional ring of plastics is provided which is ensuring the tightness between the entry side and the exit side, wherein such annular plastics element is flexible and is exerting an axial pressure on the filter element. This is the purpose to avoid a leakage between the inlet and the outlet due to the axial elongation of the housing at higher temperatures.

It is the task to be solved by the present invention to improve a filter of the above-identified kind in such a way that the filter can be manufactured with a substantially smaller expenditure.

In connection with a filter of the above-identified kind, this task basically is solved by the features that the end faces of the filter element directly are joined with the opposed end walls of the housing.

By this the advantage is achieved that the additional plastics element on the top end face of the filter element is not necessary anymore since the direct connection between housing and filter element in any case is ensuring the absolute tightness. Such design is possible on the basis of the knowledge that the axial elongation of the housing due to pressure or thermal influences or chemical restraints does not have any effect with respect to the tightness since it has been found that this elongation does not create any bypasses but instead the housing blows up like a balloon. The filter according to the invention therefore is not consisting anymore of four parts as usual but merely of the two housing parts and the filter element.

An especially preferred embodiment according to the invention can be created by the features that the top part is joined with the bottom part by hot mirror welding and the filter element is joined with the housing by infrared-welding. By this the advantage is achieved that the manufacture of the filter so to say can be performed in a single step and in a corresponding mould since both weldings can be performed simultaneously.

In an advantageous improvement according to the invention the filter element is consisting of paper, fabric or screen material.

In detail, it is preferred that the housing is consisting of POM.

An especially preferred embodiment according to the invention can be created by the features that the end walls in each a welding area are having an increased wall thickness. By this, an especially secure welding of the two end faces of the filter element with the housing is ensured due to the fact that to this end additional material is present.

In detail it is further preferred that the filter element is held between the end walls with an axial pressure. On the one hand, this provides for the advantage that the infrared-welding of the end faces of the filter element with the end walls of the housing is more safe with respect to the tightness and that further the slight axial pressure which is remaining possibly in the filter element after the manufacture is giving an additional compensation for alternations in length.

In a preferred embodiment the increased wall thickness of the end walls is performed as a reinforcement projecting into the interior space of the housing.

In the following, the invention is more detailly described with reference to an exemplary embodiment shown in the drawings. In the drawings show:

FIG. 1 a schematic lateral sectional view of the filter according to the invention;

FIG. 2 a schematic sectional view of the filter according to FIG. 1 roughly in the plane of the joint between the housing parts, and FIG. 3 in an increased scale a detail of FIG. 1.

As shown in the drawings, the exemplary embodiment of the filter 1 is having a housing 2 of a suitable plastics which is consisting of a top part 4 and a bottom part 6. Within the housing in an annular space 7 a concertina-like folded filter element 8 is positioned separating an inlet 10 of the housing 2 from an outlet 12. The top part 4 is joined with the bottom art 6 in a welding area 14 by welding.

As shown, the end faces 16 and 18 of the filter element 8 directly are joined with the opposed end wall 20 and 22 of the housing 2 without an additional ring or the like being provided.

The top part 4 is joined with the bottom part 6 preferably by hot mirror welding. The filter element 8 is joined with its end face 16 with the opposed end wall 20 of the top part 4 by infrared-welding and the opposite end face 18 of the filter element 8 is joined with the opposed end wall 22 of the bottom part 6 by infrared-welding, too, wherein these welding connections are made in a top welding area 24 and a bottom welding area 26, respectively. The welding areas 24 and 26 corresponding to the shape of the end faces 16 and 18 and the end walls 20 and 22, respectively, are performed annularly, too.

The filter element 8 can consist of paper, fabric or screen material and the housing 2 preferably is consisting of POM.

As shown and as can be learned especially from FIG. 3, the end walls 20 and 22 are having an increased wall thickness in the welding areas 24 and 26 which in the embodiment shown are performed as reinforcements 28 projecting into the interior space 30. This reinforcement 28 in the welding areas 24 and 26 is ensuring that a sufficient amount of material for the infrared-welding for joining the end faces 16 and 18 of the filter element 8 is present.

It is further preferred that the filter element is held between the end walls 20 and 22 under an possibly small axial pressure, whereby a safe connection of the end faces 16 and 18 of the filter element during the infrared-welding is ensured.

For manufacturing the filter 1, firstly, the filter element 8 is inserted into the bottom part 6 or the top part 4 and the respective other part 4 or 6 is positioned there-above and thereafter the unit created thereby is positioned in a device. The device is having an apparatus for hot mirror welding in the welding area 14 as well as a means for infrared-welding in the welding areas 24 and 26. After inserting the unit consisting of the top part 4, the bottom part 6 and the filter element 8, the top part 4 is pressed onto the bottom part 6, whereby an axial pressure is created in the filter element 8 held between the end walls 20 and 22. Thereafter simultaneously the POM of the top part 4 and the bottom part 6 in the welding area 14 is welded by hot mirror welding while in the welding areas 24 and 26 the infrared-welding is done by the means of which the end faces 16 and 18 of the filter element 8 are joined with the end walls 20 and 22 of the housing 2 in a media-tight manner.

It is obvious that thereby the production of the filter 1 according to the invention is substantially simplified, wherein additionally the costs of the mould for an additional element are safe.

All features and advantages of the invention including constructive details and positions in space, which can be learned from the specification, the claims and the drawings can be essential for the invention by themselves or in deliberate combination.

The invention claimed is:

1. A filter, comprising:
   an annular housing including an opening, a top part and a bottom part connected to the top part, wherein
      the top and bottom parts have end walls, respectively, and
      the opening extends through the annular housing along an axis of the housing;
   a filter element located in the housing and having end faces which face and are directly joined to the end walls of the top and bottom parts, respectively;
   an inlet; and
   an outlet which is separated from the inlet by the filter element.

2. The filter according to claim 1, wherein
   the top part is joined with the bottom part by a hot mirror welding area, and
   the filter element is joined with the housing by an infrared-welding area.

3. The filter according to claim 1, wherein the filter element includes paper, fabric or screen material.

4. The filter according to claim 1, wherein the annular housing includes plastic material which is POM.

5. The filter according to claim 1, wherein
   the end faces of the filter element are directly joined to the respective end walls at welding areas, and
   each of the end walls has an increased thickness along the axis of the annular housing in each of said welding areas.

6. The filter according to claim 5, wherein the increased thickness defines a reinforcement projecting along the axis of the annular housing into an interior of the annular housing.

7. The filter according to claim 1, wherein the filter element is directly held between the end walls by an axial pressure.

8. A filter, comprising:
   an annular housing including a top part and a bottom part connected to the top part, the top and bottom parts having end walls, respectively;
   a filter element located in the housing and having end faces which face and are directly joined to the end walls of the top and bottom parts, respectively;
   an inlet; and
   an outlet which is separated from the inlet by the filter element,
   wherein
   each of the top part and the bottom part includes a cylindrical inner wall and a cylindrical outer wall spaced from the cylindrical inner wall in a radial direction of the annular housing, and
   the filter element is sandwiched between the inner cylindrical wall and the outer cylindrical wall in the radial direction.

9. The filter according to claim 8, wherein
   the filter element divides the housing into a first annular space and a second annular space,
   said first annular space is between the filter element and the inner cylindrical walls, and said second annular space is between the filter element and the outer cylindrical walls.

10. The filter according to claim 9, wherein the inlet is located in the first annular space and the outlet is located in the second annular space.

11. The filter according to claim 1, wherein the inlet and the outlet are not coaxial with each other.

12. A filter, comprising:
   a housing including an opening, a top part and a bottom part that is connected to the top part, the opening extending through the entire housing along an axis of the housing;
   a filter element located in the housing and surrounding the axis of the housing; and
   an inlet and an outlet, which are separated from each other by the filter element,
   wherein
   the top and bottom parts of the housing have end walls, respectively,
   the filter element has end faces which face and are directly joined to the end walls of the top and bottom parts, respectively, and
   the inlet and the outlet are not located on the axis of the housing.

13. The filter according to claim 12, wherein the inlet is closer to the axis of the housing than the outlet.

14. The filter according to claim 12, wherein the filter element has a plurality of folds extending around the axis of the housing, and the inlet and the outlet are located in different folds.

15. The filter according to claim 1, wherein the opening extends from an uppermost surface of the end wall of the top part to a lowermost surface of the end wall of the bottom part.

16. The filter according to claim 8, wherein the housing has an opening extending from an uppermost surface of the end wall of the top part to a lowermost surface of the end wall of the bottom part.

17. The filter according to claim 12, wherein the opening extends from an uppermost surface of the end wall of the top part to a lowermost surface of the end wall of the bottom part.

* * * * *